(No Model.)
H. A. HARSHAW.
HANDLE BAR ATTACHMENT FOR BICYCLES.
No. 558,019.          Patented Apr. 7, 1896.
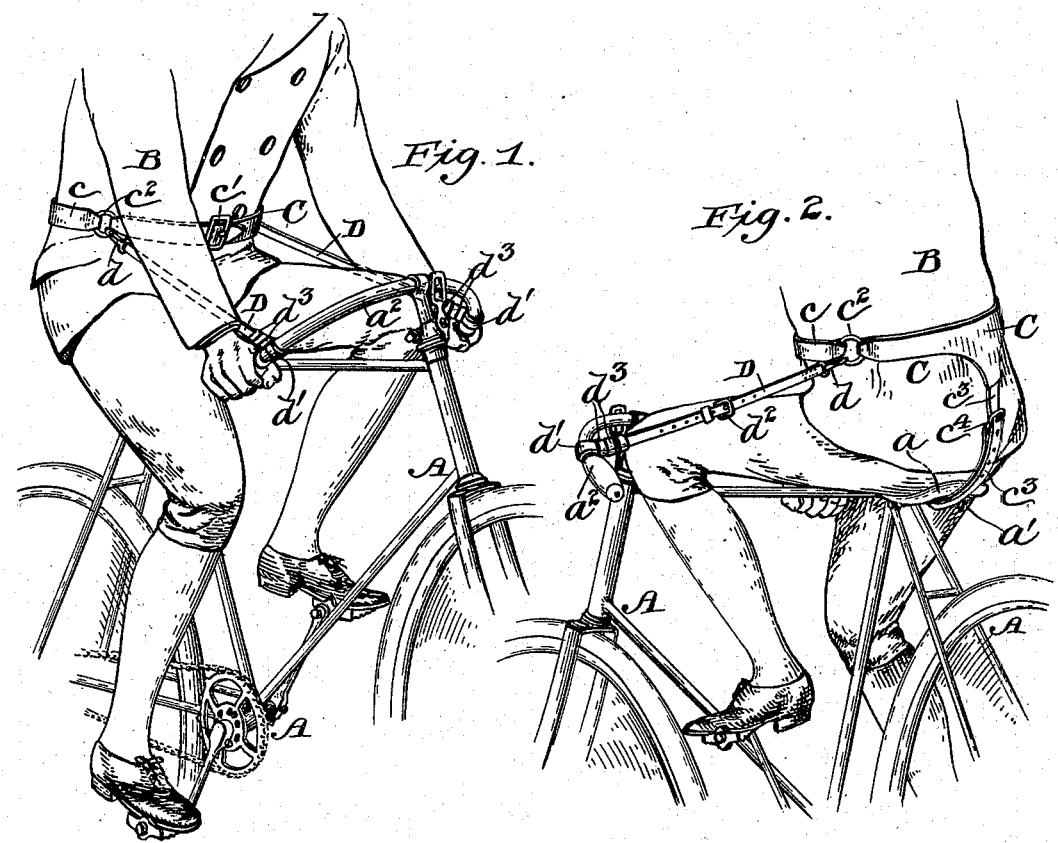
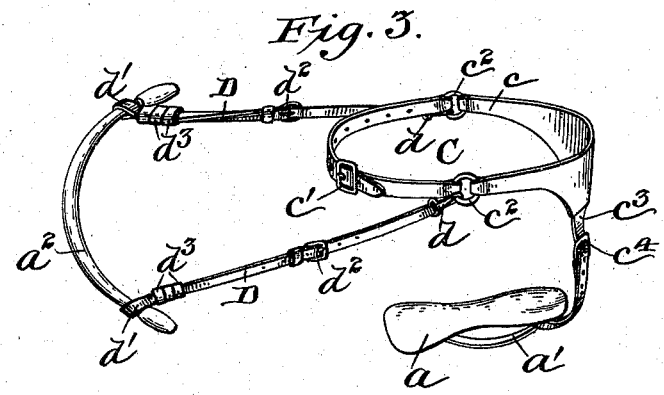
WITNESSES
INVENTOR

United States Patent Office.

HENRY A. HARSHAW, OF OSHKOSH, WISCONSIN.

HANDLE-BAR ATTACHMENT FOR BICYCLES.

SPECIFICATION forming part of Letters Patent No. 558,019, dated April 7, 1896.

Application filed October 23, 1895. Serial No. 566,643. (No model.)

*To all whom it may concern:*

Be it known that I, HENRY A. HARSHAW, a citizen of the United States, residing at Oshkosh, in the county of Winnebago and State of Wisconsin, have invented certain new and useful Improvements in Handle-Bar Attachments for Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in bracing and steering devices for bicycle-riders; and the objects are, first, to provide a support or rest for the body and back, and, second, to provide means for guiding or steering the bicycle without placing the hands on the handles.

The invention consists of the combination, with a belt to surround the rider's waist, of straps connected to said belt and adapted to be connected to the respective ends of the handle-bar of the bicycle.

It also consists of certain other novel constructions, combinations, and arrangements of parts, all of which will be hereinafter set forth and claimed.

In the accompanying drawings, forming part of this specification, Figure 1 represents a perspective view, taken from the front, of a bicycle-rider provided with my invention, the machine and rider being partly broken away. Fig. 2 represents a perspective view of the same, taken from the rear; and Fig. 3 represents a perspective view of my invention, showing its attachment to the handle-bar and seat-spring.

In the drawings, A represents the bicycle, B the rider, and C my improved bracing, supporting, or guiding device. The latter comprises a belt $c$, having an adjusting buckle $c'$, side securing-rings $c^2$, and a rear pendent strap $c^3$, having an adjusting-buckle $c^4$. This strap $c^3$ is adapted to be attached to the spring $a'$ of the saddle $a$ by being slipped around the same or by any suitable snap-hook or catch. Straps D D have their respective inner ends attached to the rings $c^2$ by snap-hooks $d\ d$, and their opposite ends attached to the respective ends of the handle-bar $a^2$ by loops $d'\ d'$. These loops are formed by doubling the straps back upon themselves and adjustably securing them by buckles $d^2$. Rings or loops $d^3$ are slipped over said doubled portions, so as to firmly confine the loops $d'$ on the ends of the handle-bar. All of the straps and the belt can be adjusted to fit any sized rider by their respective buckles.

I am aware that harnesses or appliances have heretofore been used passing over the shoulders of the rider and connecting with the frame of the bicycle to brace the rider perpendicularly. My invention, however, braces the rider horizontally, and is for the additional purposes of resting the rider and guiding the machine.

By means of my invention the rider has a complete back support and rest, as well as a brace horizontally to afford stability and security in pedaling. The machine may be guided by the movement of the body and the hands may be used for carrying packages.

I do not regard the strap $c^3$, connecting the belt with the rear end of the seat, as essential to my invention. It affords additional support to the back and body, but may be dispensed with.

Having now described my invention, what I claim as new, and desire to secure by Letters Patent, is—

A bracing supporting and steering device for cyclers comprising an adjustable belt to surround the rider's waist, adjustable straps detachably connected to said belt and adapted to be connected to the respective ends of the handle-bar and an adjustable strap connected to the rear under side of the belt and adapted to be connected to the rear of the bicycle-seat, substantially as described.

In testimony whereof I affix my signature in presence of two witnesses.

HENRY A. HARSHAW.

Witnesses:
S. WITHARTZ,
HENRY HENKEL.